United States Patent
Azuma et al.

(10) Patent No.: US 9,717,355 B2
(45) Date of Patent: Aug. 1, 2017

(54) CUP-TYPE CONTAINER AND METHOD OF FORMING THE SAME

(71) Applicant: TOYO SEIKAN GROUP HOLDINGS, LTD., Tokyo (JP)

(72) Inventors: Toshifusa Azuma, Kanagawa (JP); Yutaka Asano, Kanagawa (JP); Shigenori Ueda, Kanagawa (JP); Motohiko Shimada, Tokyo (JP); Masaru Yamaguchi, Tokyo (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 16 days.

(21) Appl. No.: 14/443,497

(22) PCT Filed: Nov. 20, 2013

(86) PCT No.: PCT/JP2013/081266
§ 371 (c)(1),
(2) Date: May 18, 2015

(87) PCT Pub. No.: WO2014/080934
PCT Pub. Date: May 30, 2014

(65) Prior Publication Data
US 2015/0289691 A1 Oct. 15, 2015

(30) Foreign Application Priority Data

Nov. 20, 2012 (JP) .................................. 2012-254681
Nov. 20, 2012 (JP) .................................. 2012-254682

(51) Int. Cl.
*B65D 1/40* (2006.01)
*A47G 19/22* (2006.01)
(Continued)

(52) U.S. Cl.
CPC .......... *A47G 19/2205* (2013.01); *B29C 43/02* (2013.01); *B29C 43/027* (2013.01);
(Continued)

(58) Field of Classification Search
CPC ...... A47G 19/2205; B65D 2543/00537; B65D 2543/00296; B65D 2543/00092; B65D 2543/00685; B65D 2543/00564
(Continued)

(56) References Cited

U.S. PATENT DOCUMENTS 4,014,970 A      3/1977   Jahnle
4,689,099 A *    8/1987   Ito .............................. A61J 1/16
                                                                156/537
(Continued)

FOREIGN PATENT DOCUMENTS

EP    1 477 407    11/2004
EP    2 065 152    6/2009
(Continued)

OTHER PUBLICATIONS

European Search Report dated Jun. 3, 2016 issued in counterpart EP application No. 13856131.1 (9 pages).
(Continued)

*Primary Examiner* — Shawn M Braden
(74) *Attorney, Agent, or Firm* — Greenblum & Bernstein, P.L.C.

(57) ABSTRACT

A cup-type container obtained by compression-forming a thermoplastic resin and including at least a flange portion, a body portion and a bottom portion, wherein a ratio (L/D) of the height of the container to the diameter of the opening is not less than 1.0, and if the direction of height of a test piece cut out from the body portion of the container is denoted by x and the circumferential direction thereof by y, a half-value width P at a half peak of a Miller index at a diffraction angle
(Continued)

2θ=14.5° that represents the diffraction by the crystal plane (110), is in a range of 1.25 to 1.5 over the whole body portion in a peak intensity profile in the direction of height (x-direction) of a Debye's ring obtained by measuring the diffraction intensities by causing the X-rays to be incident on an x-y plane of the test piece at right angles thereto. The cup-type container is evenly oriented in the direction of height of the container and in the circumferential direction thereof, has an even strength in all directions and has excellent heat resistance. The invention, further, provides a method of forming the cup-type container.

12 Claims, 8 Drawing Sheets

(51) Int. Cl.
| | |
|---|---|
| *B29C 43/34* | (2006.01) |
| *B29C 43/58* | (2006.01) |
| *B65D 1/26* | (2006.01) |
| *B29C 43/02* | (2006.01) |
| *B29C 43/20* | (2006.01) |
| *B29L 31/00* | (2006.01) |
| *B29K 23/00* | (2006.01) |

(52) U.S. Cl.
CPC ............ *B29C 43/203* (2013.01); *B29C 43/34* (2013.01); *B29C 43/58* (2013.01); *B65D 1/26* (2013.01); *B29C 2043/5825* (2013.01); *B29C 2043/5833* (2013.01); *B29K 2023/12* (2013.01); *B29K 2905/00* (2013.01); *B29K 2995/0045* (2013.01); *B29L 2031/7132* (2013.01)

(58) Field of Classification Search
USPC ........................................................ 220/62.22
See application file for complete search history.

(56) References Cited

U.S. PATENT DOCUMENTS

| | | |
|---|---|---|
| 5,110,280 A | 5/1992 | Kawaguchi |
| 8,236,398 B2 | 8/2012 | Nagao |
| 2002/0098310 A1 | 7/2002 | Kikuchi |
| 2003/0047565 A1 | 3/2003 | Oda |
| 2005/0017391 A1 | 1/2005 | Kobayashi |
| 2005/0140036 A1 | 6/2005 | Hirota |
| 2007/0092615 A1* | 4/2007 | Fisk .................. A47G 19/2205 426/416 |
| 2010/0233398 A1 | 9/2010 | Nagao |

FOREIGN PATENT DOCUMENTS

| | | |
|---|---|---|
| JP | 6-2359 | 1/1994 |
| JP | 9-174781 | 7/1997 |
| JP | 2001-191353 | 7/2001 |
| JP | 2001-252972 | 9/2001 |
| JP | 2002-103428 | 4/2002 |
| JP | 2003-236918 | 8/2003 |
| JP | 2004-75151 | 3/2004 |
| JP | 2005-313590 | 11/2005 |
| JP | 3766249 | 2/2006 |
| WO | WO2008/032841 | 3/2008 |

OTHER PUBLICATIONS

PCT Search Report issued in PCT/JP2013/081266.
Chinese Office Action dated Mar. 4, 2016 issued in counterpart Chinese application No. 201380070867.8 (6 pages).

* cited by examiner

CUP-TYPE CONTAINER AND METHOD OF FORMING THE SAME

TECHNICAL FIELD

This invention relates to a cup-type container and to a method of forming the same. More specifically, the invention relates to a cup-type container having improved heat resistance and improved mechanical strength such as shatter strength of the bottom portion and a method of forming the cup-type container.

BACKGROUND ART

As containers for containing beverages and foods, there have heretofore been widely used cup-type containers comprising a thermoplastic resin and having a body portion hanging down from the inner edge of the flange and a bottom portion.

A variety of methods have been proposed for forming the cup-type containers, such as those methods that are usually based on the injection forming or the pressure forming. There has, further, been proposed a forming method based on the compression forming (patent document 1).

However, a thin cup-type container made from a polypropylene by injection forming or pressure forming has a high degree of anisotropy in the molecular orientation of the container, and cannot provide a sufficient degree of heat resistance and is not, either, still satisfactory from the standpoint of gas barrier property of the container.

Even if the container is formed by the compression forming described in the above patent document 1, the space for forming the side wall is limited earlier than the flow of the resin; i.e., the resin must flow through the limited space. Therefore, anisotropy occurs in the molecular orientation, and a satisfactory heat resistance is not obtained.

Besides, forming the articles by the injection forming or the pressure forming is necessarily accompanied by the generation of scrap resins. Therefore, it has been desired to efficiently form the polypropylene cups without developing scrap resins.

In order to solve the above problems, there have been proposed cup-type containers made from a polypropylene by the compression forming, the cup-type containers being uniformly oriented in the direction of height of the container and in the circumferential direction thereof, and having a uniform strength in all directions and improved mechanical strengths such as shatter strength, shock resistance and strength against the pressure (patent document 2). In the cup-type containers formed by the compression forming, the problem of anisotropy in the molecular orientation has been solved, and attention has been given to the β-crystals in the crystal structure of the polypropylene. Namely, the β-crystals are made present in at least locally in the body portion making it possible to impart excellent heat resistance to the cup-type containers.

PRIOR ART DOCUMENTS

Patent Documents

Patent document 1: JP-B-6-2359
Patent document 2: WO2008/32841

OUTLINE OF THE INVENTION

Problems that the Invention is to Solve

Among the cup-type containers formed by the compression forming, however, those cup-type containers having ratios (L/D) of the container heights to the mouth diameters of the containers of not less than 1.0 are accompanied by a problem in that the resin flows poorly at the time of compression forming as compared to the cup-type containers having the ratios L/D of less than 1.0. To form a stacking portion, further, the body portion must often include a portion that is thicker than 1.0 mm. In such a case, no β-crystal is formed and it becomes difficult to impart excellent mechanical strength that was described above.

Further, if the container has a multi-layer structure including an intermediate layer of a gas-barrier resin such as an ethylene/vinyl alcohol copolymer, the intermediate layer does not stretch to a sufficient degree since the gas-barrier resin has a melt viscosity that is larger than a melt viscosity of the polyolefin resin that constitutes the inner and outer layers. Therefore, it becomes difficult to have the intermediate layer reliably present in up to the flange portion. Besides, the inner layer tends to become thinner than the outer layer, and the intermediate layer of the gas-barrier resin becomes likely to be affected by the water component contained in the container and loses gas-barrier property.

To form the cup-type container by the compression forming, further, a mass of molten resin is fed into the lower metal mold and is, thereafter, compressed by moving either the upper metal mold or the lower metal mold, and the molten resin is caused to flow through a space formed by the upper metal mold and the lower metal mold to form the molten resin into the shape of a container. Here, the temperature on the surface of the metal mold is lower than the temperature of the molten resin mass. Therefore, the molten metal mass that has come in contact with the lower metal mold is partly cooled prior to starting the compression; i.e., at the time of compression, the cooled part of the molten resin mass flows poorly as compared to the molten resin mass that is not in contact with the metal mold. As a result, the molecular orientation differs depending on the positions, and the heat resistance decreases. This problem appears specifically in the bottom portion of the cup-type container.

It is, therefore, an object of the present invention to provide a cup-type container which is uniformly oriented in the direction of height of the container and in the circumferential direction thereof, has a uniform strength in all direction, and has excellent heat resistance and gas-barrier property despite the cup-type container has a ratio L/D of not less than 1.0 and includes in the body portion thereof a portion having a thickness of lower than 1.0 mm, as well as to provide a method of forming the cup-type container.

Another object of the invention is to provide a cup-type container forming a multi-layer structure from the bottom portion thereof up to the flange portion thereof, and including an intermediate layer that is positioned being deviated toward the outer layer side as compared to that of the conventional counterparts.

A further object of the invention is to provide a cup-type container without difference in the molecular orientation irrespective of the position in the bottom portion and having excellent mechanical strength such as shatter strength in the bottom portion, as well as to provide a method of forming the cup-type container.

Means for Solving the Problems

According to the present invention, there is provided a cup-type container obtained by compression-forming a thermoplastic resin and including at least a flange portion, a body portion and a bottom portion, wherein a ratio (L/D) of the height of the container to the diameter of the opening is not less than 1.0, and if the direction of height of a test piece cut out from the body portion of the container is denoted by x and the circumferential direction thereof by y, a half-value width P at a half peak of a Miller index at a diffraction angle 2θ=14.5° that represents the diffraction by the crystal plane (110), is in a range of 1.25 to 1.5 over the whole body portion in a peak intensity profile in the direction of height (x-direction) of a Debye's ring obtained by measuring the diffraction intensities by causing the X-rays to be incident on an x-y plane of the test piece at right angles thereto.

According to the present invention, further, there is provided a cup-type container obtained by compression-forming a thermoplastic resin and including at least a flange portion, a body portion and a bottom portion, wherein a rate of change K of half-value width represented by the following formula (1), $$K=P_2/P_1 \quad (1)$$

wherein $P_1$ is a measuring point at the center of the bottom portion, $P_2$ is a measuring point at the bottom portion where, if the radius of the bottom is denoted by R and the distance from the measuring point at the center of the bottom by r, the radius ratio from the center of the bottom is r/R>0.7, and if the radial direction of a test piece of the bottom portion cut out from the measuring point is denoted by x and the circumferential direction thereof by y, a half-value width is the width at a half peak of the Miller index at a diffraction angle 2θ=14.5° that represents the diffraction by the crystal surface (110) in a peak intensity profile in the radial direction (x-direction) of a Debye's ring obtained by measuring the diffraction intensities by causing the X-rays to be incident on an x-y plane of the test piece at right angles thereto, is in a range of 0.95 to 1.05.

In the cup-type container of the invention, it is desired that:
1. A multi-layer structure is formed in all of the body portion and the bottom portion;
2. The multi-layer structure comprises at least inner and outer layers of a polypropylene and an intermediate layer of another thermoplastic resin, the inner and outer layers completely covering the intermediate layer so that the intermediate layer is not exposed to the surface of the container;
3. In the body portion, the ratio of the thickness from the inner surface to the center of thickness of the intermediate layer and the thickness from the outer surface to the center of thickness of the intermediate layer, is in a range of inner surface side:outer surface side=3:7 to 6:4;
4. A step for stacking is formed in the inner surface or in the outer surface of the body portion; and
5. The thickness of the body portion is not more than 2.0 mm.

According to the present invention, further, there is provided a method of compression-forming the cup-type container by using a lower metal mold and an upper metal mold having portions for defining the body portion of the container and portions for defining the bottom portion thereof, feeding a molten resin mass into the lower metal mold, and compressing the molten resin mass with the upper metal mold and the lower metal mold, wherein after the molten resin mass is fed into the lower metal mold, the rate of compression is in a range of not more than 100 mm/second at a point 5 mm before a point where the forming is completed by the movement of the upper metal mold or the lower metal mold.

In the method of compression-forming the cup-type container of the invention, it is desired that:
1. A portion that becomes an end of the opening or a part thereof is defined prior to the movement of the upper metal mold or the lower metal mold, and at the time when the upper metal mold or the lower metal mold moves, the compression forming is conducted while varying the thickness of the portions that form the bottom portion and the body portion of the container;
2. The molten resin mass is fed into the lower metal mold so as to come in contact with the portion that has at least the radius ratio r/R>0.7 defining the bottom portion of the lower metal mold;
3. The molten resin mass is fed into the lower metal old so as to come in contact with nearly the whole surface of the portion that defines the bottom portion of the lower metal mold; and
4. The molten resin mass has a multi-layer structure including a core layer and shell layers.

Effects of the Invention

Despite of having a ratio (L/D) of the height (L) of the container to the diameter (D) of the opening of not less than 1.0, the cup-type container of the present invention has a half-value width P at a half peak of a Miller index at a diffraction angle 2θ=14.5° that represents the diffraction by the crystal plane (110), in a range of 1.25 to 1.5 and, specifically, 1.3 to 1.4 over the whole body portion in the direction of height thereof. That is, the cup-type container is oriented nearly isotropically and has excellent heat resistance.

Besides, the resin has been sufficiently stretched in the direction of height. In the cup-type container having a multi-layer structure, therefore, the intermediate layer can be formed from the bottom portion through up to the flange portion without being exposed to the surface of the container. Besides, as compared to the conventional cup-type containers formed by the injection forming or the like method, it is allowed to position the intermediate layer on the outer layer side. Even in case a gas-barrier resin that is subject to be affected by the water component in the content is used as the intermediate layer, therefore, excellent gas-barrier property can be obtained without being impaired.

Moreover, the cup-type container of the present invention features excellent transparency and dimensional precision as compared to the cup-type containers formed by the injection forming or the pressure forming.

When it is attempted to form a tall cup-type container having a large L/D value by the compression forming method, in general, the molecules tend to be more oriented in the direction of height than in the circumferential direction and, therefore, the molecular orientation tends to become anisotropic. In the method of forming the cup-type container of the present invention, the rate of forming (rate of compression) in the compression forming is slowed down to vary the rate of shearing the resin making it possible to control the flow of the resin in the direction of height. As a result, orientation of the resin is suppressed in the direction of height, the P-value is controlled to lie in the above-mentioned range, the molecules can be oriented nearly isotropically, and the cup-type container is provided having excellent heat resistance as mentioned above.

Further, even when the cup-type container has a multi-layer structure including an intermediate layer of a thermoplastic resin that has a melt viscosity higher than that of olefin resins such as ethylene/vinyl alcohol copolymer and the like, the rate of forming is controlled to establish a parabolic flow in the space (flow passage of resin) for forming the body portion between the lower metal mold and the upper metal mold. This permits the intermediate layer to stretch together with the inner and outer layers; i.e., the intermediate layer can be formed up to the flange portion.

The above-mentioned actions and effects of the present invention will also become obvious from the results of Examples appearing later.

That is, in Examples 1 to 4, the compression forming is conducted while varying the thickness of the portions that form the body portion and the bottom portion of the container and, therefore, the resin is gradually extruded and stretched causing the molecules to be oriented little. Therefore, the half-value width P of the Miller index at a diffraction angle $2\theta=14.5°$ that represents the diffraction by the crystal surface (110), is as relatively large as 1.3 to 1.5.

In Comparative Example 1, on the other hand, the width of the resin flow passage remains constant in the step of injection forming; i.e., the resin is injected into a narrow flow passage, and the molecules are more oriented. Therefore, the half-value width P is as small as 1.1 to 1.2.

In Comparative Example 2, a sheet-like resin is pushed by a plug at a temperature lower than that of any other forming method and is stretched with the compressed air. Therefore, the molecules tend to be oriented, and the half-value width P is not more than 1.1 and is the smallest.

In Example 3, the forming method is the same as that of Examples 1 to 4 but the thickness is small. Therefore, the resin flows less easily and the half-value width P is considered to be small.

Here, the smaller the half-value width, i.e., the more the molecules are oriented, it will be learned that the container shrinks upon the heating. This can be attributed to be that the orientation of molecules is relaxed by the heating.

In Example 5, the rate of compression forming is as large as 130 mm/sec at a point 5 mm before the point where the forming is to be completed, and the resin of the intermediate layer is not reaching the root position of the flange in many of the points. In Example 6, on the other hand, the rate of compression forming is as small as 40 mm/sec at a point 5 mm before the point where the forming is to be completed, and the resin of the intermediate layer is reaching beyond the root position of the flange over the entire cup-type container.

In the cup-type container of the present invention, further, the molecular orientation differs little depending on the positions as the value K represented by the above formula (1) approaches 1. Therefore, the cup-type container of the present invention exhibits excellent heat resistance to realize the actions and effects described above.

In regard to the above formula (1), further, if a distance from the center a of the bottom to the outermost end 12c of the grounding portion is denoted by 1 as shown in FIG. 6 that will be described later, the value K is measured at a point separated away from the center a of the bottom by a distance of not less than 0.7. Therefore, there is a meaning in rendering the judgement at a place where it becomes a crucial point if the molten resin mass is in contact with the lower metal mold in compression-forming the cup-type container.

In compression-forming the cup-type container by the forming method of the invention, further, the molten resin mass is so fed into the lower metal mold as to come in contact with nearly the whole surface of the portion that defines the bottom portion of the lower metal mold preventing the occurrence of non-uniform molecular orientation that is caused if the molten resin mass cools down locally.

That is, as the molten resin mass fed into the lower metal mold comes in contact with nearly the whole areas up to the outermost end of the portion defining the bottom portion of the lower metal mold, the molecules are oriented in the bottom portion of the cup-type container that is formed, i.e., the molecules are oriented in the same manner as near the central portion even in the portions on the circumferential side away from the central portion. Namely, the molecules are uniformly oriented over the whole bottom portion making it, therefore, possible to provide a cup-type container having excellent mechanical strength in the bottom portion and excellent heat resistance.

The above-mentioned actions and effects of the invention will also become clear from the results of Examples appearing later.

That is, in Examples 1 to 4, the diameter of the molten resin mass is relatively close to the diameter of the bottom and, therefore, the portion that is in direct contact with the lower metal mold is spreading over the whole surface of the bottom during the period of after the molten resin mass is fed onto the lower metal mold until the upper metal mold is lowered down. The metal mold is being cooled at all times. Therefore, the portion that is in direct contact with the metal mold is cooled and solidified before it is being formed; i.e., the resin flows less at the time of forming and the molecules are less oriented. Namely, the molecules are uniformly oriented over the whole bottom surface, and the rate of change K of the half-value width assumes a value close to 1.0 over the whole bottom surface.

On the other hand, referring to Comparative Example 4, if the molten resin mass has a smaller bottom diameter than that of the Examples, only a limited portion is in direct contact with the metal mold that has been cooled since before the forming operation, and a portion close to the bottom end comes into contact with the metal mold for the first time at the time of the forming operation. In the portion close to the bottom end, the resin flows during the forming operation and the molecules could be oriented. Therefore, the rate of change of the half-value width decreases as it goes away from the center of the bottom.

In the injection-formed cup-type container of Comparative Example 1, the rate of change K of the half-value width is close to 1.0 over the whole bottom surface and the molecules are oriented relatively evenly. Referring to Table 6(A), however, the half-value width at half peak is smaller than 1.3 and it is learned that the molecules have been oriented already at the center of the bottom. This is attributed to that the resin is injected through a gate that has a narrow flow passage.

In the compretion-formed cup-type container of Comparative Example 2, the rate of change K of the half-value width is close to 1.0 over the whole bottom surface like that of Comparative Example 1 and, therefore, the molecules are oriented relatively evenly. From Table 6(A), however, the half-value width at half peak is smaller than 1.1 which also is smaller than that of Comparative Example 1, and it is learned that the molecules have been greatly oriented already at the center of the bottom.

CUP-TYPE CONTAINERS

The cup-type container of the present invention includes at least a body portion and a bottom portion, the body portion including a portion where the thickness is not less than 1.0 mm, and, preferably, has a ratio (L/D) of the height (L) of the container and the diameter (D) of the opening of not less than 1.0 and, specifically, in a range of 1.5 to 2.0.

In the invention, the body portion may have a thickness of not less than 1.0 mm in only a portion thereof in the direction of height or may have a thickness of not less than 1.0 mm over the whole body portion. Specifically, as will be concretely described later, it is desired that the body portion has a thickness (t1 in FIG. 1) of not less than 1.0 mm at a position where a stacking portion is formed and has, in other portions thereof, a thickness of 1.0 to 1.8 mm from the standpoint of mechanical strength of the container and economy.

Figure 1:
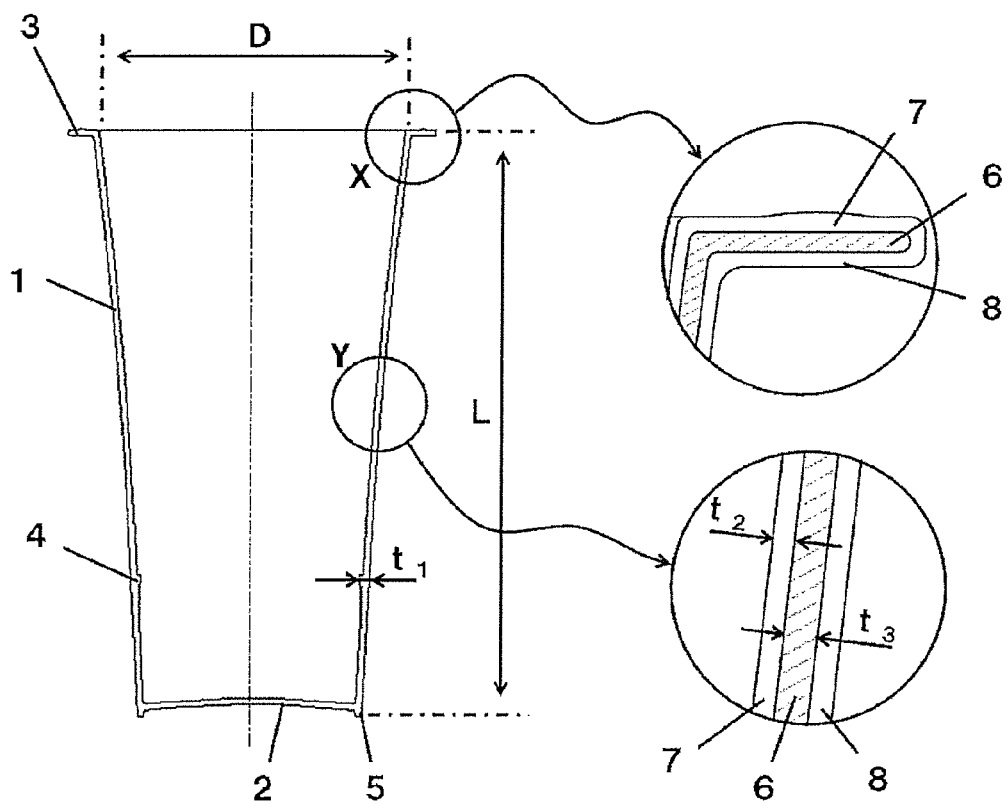
FIG. 1 is a view of a cup-type container of the present invention.

The cup-type container can employ various structures, and though not limited thereto only, FIG. 1 shows one of the examples. The cup-type container of the invention shown in FIG. 1 comprises a body portion 1 and a bottom portion 2 continuous to the body portion 1, and has a flange 3 formed at an end of the opening. Further, a step is formed on the inner surface at a lower part of the body portion 1, i.e., a stacking portion 4 is formed so that the cup-type containers can be stacked. Further, an annular leg portion 5 is formed on the bottom portion 2. In this example, though the stacking portion 4 is formed on the inner surface side, it may be formed on the outer surface side, as a matter of course.

Further, in the cup-type container of the multi-layer structure having inner and outer layers of a thermoplastic resin and an intermediate layer of a gas-barrier resin as represented by a portion X on an enlarged scale in an inset in FIG. 1, the intermediate layer 6 is formed up to the flange portion 3 without being exposed to the surface of the container but being completely sealed with the inner layer 7 and with the outer layer 8.

Further, in the body portion as represented by a portion Y on an enlarged scale in an inset of FIG. 1, the ratio of thickness from the inner surface to the center of thickness of the intermediate layer and the thickness from the outer surface to the center of thickness of the intermediate layer, is in a range of 3:7 to 6:4. Namely, the intermediate layer is positioned on the outer layer side as compared to that of the injection-formed cup-type containers.

(Thermoplastic Resins)

The cup-type container of the invention may comprise a single layer of a thermoplastic resin. Desirably, however, the cup-type container has a multi-layer structure inclusive of an intermediate layer formed by using a functional resin such as gas-barrier resin, oxygen-absorbing resin or water vapor-barrier resin.

In the case of the single layer or the multi-layer structure, the inner and outer layers can be constituted by using a thermoplastic resin such as polyolefin resin, polyester resin, polystyrene resin, polyamide resin or polycarbonate resin though not limited thereto only.

As the polyolefin resin, there can be exemplified low-, intermediate- and high-density polyethylenes, homopolypropylene, random polypropylene, blocked polypropylene, isotactic polypropylene, syndiotactic polypropylene, propylene-ethylene copolymer, ethylene-vinyl acetate copolymer, ethylenically unsaturated carboxylic acid, and olefin resins graft-modified with the anhydrides thereof.

As the polyester resin, there can be particularly preferably used a polyester that is chiefly constituted by using a polyethylene terephthalate. Namely, there can be preferably used a polyester that contains the ethylene terephthalate unit in an amount of not less than 80 mol % and, specifically, not less than 90 mol %, and other copolymerizable components such as isophthalic acid, 2,6-naphthalenedicarboxylic acid, 1,4-butanediol and 1,4-cyclohexanedimethanol.

As the polycarbonate resin, there can be exemplified a carbonic acid ester resin derived from bicyclic divalent phenols or phosgenes, i.e., a polycarbonate derived from bisphenols such as 2,2'-bis(4-hydroxyphenyl) propane (bisphenol A), 2,2'-bis(4-hydroxyphenyl) butane (bisphenol B), or 1,2-bis(4-hydroxyphenyl) ethane.

The present invention uses, preferably, a polypropylene and, specifically, a random polypropylene from the standpoint of compression formability. It is desired that the polypropylene has a melt flow rate (MFR) in a range of 5 g/10 min. to 30 g/10 min. and, specifically, 10 g/10 min. to 20 g/10 min.

The thermoplastic resin used in the invention can be blended with blending agents known per se., such as antioxidant, heat stabilizer, ultraviolet ray absorber, antistatic agent, filler, lubricant and inorganic or organic coloring agent.

(Resins for Forming the Intermediate Layer)

[Gas-Barrier Resins]

A representative example of the gas-barrier resin is an ethylene-vinyl alcohol copolymer like, preferably, a saponified product of a copolymer obtained by saponifying an ethylene-vinyl acetate copolymer that contains an ethylene in an amount of 20 to 60% by mole and, specifically, 25 to 50% by mole such that the saponification degree is not less than 96% and, specifically, not less than 99 mol %.

As the gas-barrier resins other than the ethylene-vinyl alcohol copolymer, there can be exemplified amides such as nylon 6, nylon 6.6, nylon 6/6.6 copolymer, metaxylylene diadipamide (MXD6), nylon 6.10, nylon 11, nylon 12 and nylon 13. Among these polyamides, preferred ones have amide groups in a number in a range of 5 to 50 and, specifically, 6 to 20 per 100 carbon atoms.

[Oxygen-Absorbing Resins]

As the oxygen-absorbing resin, there can be exemplified a resin composition comprising at least an oxidizing organic component and a transition metal catalyst (oxidizing catalyst).

The resin composition that includes the oxidizing organic component and the transition metal catalyst may comprise the oxidizing organic component and the transition metal catalyst only but may, further, contain resins other than the above resin, as a matter of course.

As the resins that can be used in combination with the oxidizing organic component and the transition metal catalyst, there can be exemplified the above-mentioned polyolefin resins and gas-barrier resins, and, specifically, the ethylene-vinyl alcohol copolymers and the polyamides (particularly, a xylylene group-containing polyamide resin having a terminal amino group concentration of not less than 40 eq/$10^6$ g).

As the oxidizing organic component, there can be used those that have heretofore been used for the oxygen-absorbing resins; i.e., there can be exemplified ethylenically unsaturated group-containing polymers though not limited thereto only.

As the transition metal type catalyst, there can be preferably used metals of the Group VIII of the periodic table, such as iron, cobalt, nickel and the like. However, there can be further used metals of the Group I such as copper, silver or the like, metals of the Group IV such as tin, titanium, zirconium or the like, metals of the Group V such as vanadium or the like, metals of the Group VI such as chromium or the like, or metals of the Group VII such as manganese or the like.

It is desired that the transition metal type catalyst is contained in the oxygen-absorbing resin in such an amount that the concentration of the transition metal atoms (weight concentration basis) is in a range of 100 to 3000 ppm.

[Other Functional Resins]

As the functional resin that can be used as the intermediate layer of the cup-type container of the invention, there can be exemplified cyclic olefin resins and liquid crystal polymers in addition to the above-mentioned gas-barrier resins and the oxygen-absorbing resins.

The cyclic olefin resins, usually, have properties such as heat resistance, moisture resistance and water vapor-barrier property that are superior to those of the general-purpose thermoplastic resins. By using the cyclic olefin resin, it is allowed to impart excellent properties to the multi-layer structure.

Further, the liquid crystal polymers, usually, have properties such as rigidity, heat resistance and barrier property that are superior to those of the general-purpose thermoplastic resins. By using the liquid crystal polymer, therefore, it is allowed to impart excellent properties to the multi-layer structure.

[Adhesive Resins]

In the cup-type container having the multi-layer structure of the invention, adhesive layers can be formed, as required, among the intermediate layer and the inner and outer layers. As the adhesive resin, there can be used acid-modified polyolefins such as acid-modified polypropylene, acid-modified high-density polyethylene, acid-modified low-density polyethylene and acid-modified ethylene-vinyl acetate copolymer to which only, however, the invention is in no way limited.

(Forming Method)

In the method of forming the cup-type container of the present invention, a melt of a thermoplastic resin alone, such as polypropylene or a melt of a thermoplastic resin and other thermoplastic resin such as gas-barrier resin, is continuously extruded from an extruder and is cut by a cutting means of a known synthetic resin feeding machine to thereby prepare a molten resin mass which is in a molten state. The molten resin mass is held by a holding means, is thrown into the lower metal mold of a compression-forming machine via a guide means, is compression-formed by the upper metal mold and the lower metal mold, and is cooled and solidified to form a cup-type container. Here, in the present invention, in particular, an important feature resides in that the rate of compression is not more than 100 mm/sec and, specifically, lies in a range of 20 to 50 mm/sec at a point 5 mm before the point where the formation is completed (arrow Z in FIG. 2(B)) by the movement of the upper metal mold or the lower metal mold.

By changing the rate of shearing the resin and controlling the flow of the resin in the direction of height as described above, therefore, it is allowed to suppress the resin from being oriented in the direction of height and, therefore, to impart nearly isotropic orientation creating a parabolic flow of the resin so that the intermediate layer can be reliably extended up to the flange portion.

In the invention, the rate of compression contributes most to the formability at a point just before the movement of the upper metal mold or the lower metal mold is completely finished. Therefore, the moving velocity of the metal mold is referred to at a point 5 mm before the point where the forming is completed. There is no particular limitation concerning the lower limit of the rate of compression forming. From the standpoint of productivity on an industrial scale, however, the lower limit in the rate of the compression forming should be within the above-mentioned range.

Figure 2:
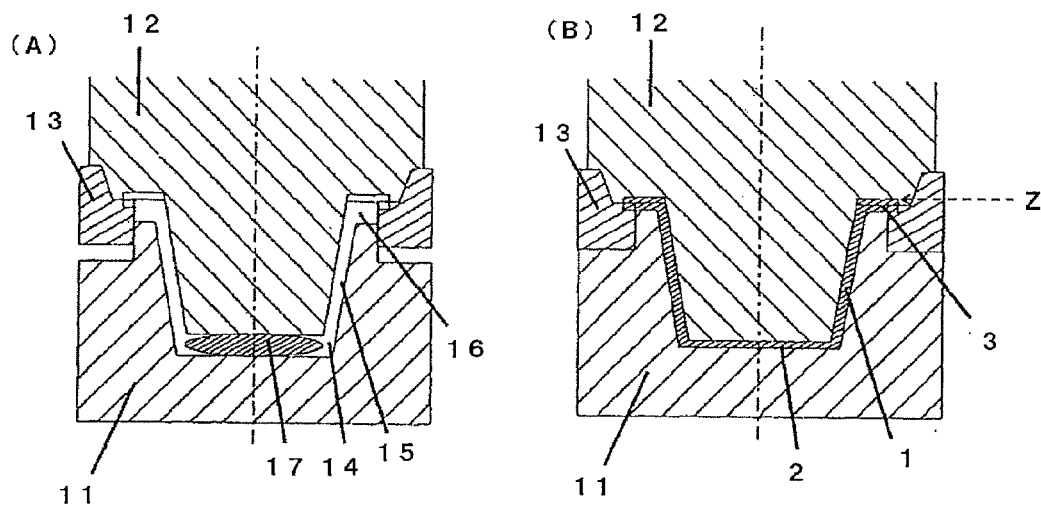
FIGS. 2(A) and 2(B) are views illustrating a forming method of the invention.
Figure 3:
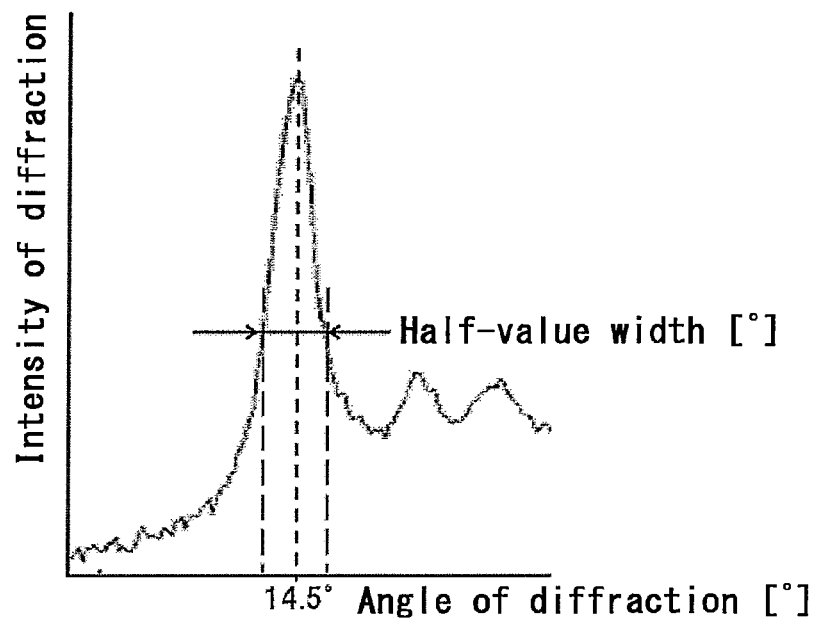
FIG. 3 is a graph illustrating a half-value width.

In the invention as shown in FIG. 2, further, a portion that becomes an end of the opening or a part thereof (flange-forming portion in FIG. 2) is defined by using a metal mold 13 that defines the flange-forming space (FIG. 2(A)) prior to pushing a molten resin mass 17 fed into a cavity (lower metal mold) 11 by lowering the core metal mold (upper metal mold) 12. Next, as the core metal mold 12 is further lowered, the thicknesses of a bottom-forming space 14 and a body-forming space 15 defined by the cavity 11 and the core metal mold 12 are gradually varied so that the thickness of the body portion is finally defined.

FIG. 2 illustrates a case where the lower metal mold is a female metal mold having a cavity and the upper metal mold is a male metal mold having a core. As will be described later with reference to FIG. 7, however, the same also holds true even when this is turned upside down so that the lower metal mold is the male metal mold and the upper metal mold is the female metal mold.

In the invention, it is particularly desired that the molten resin mass fed into the lower metal mold has such a size that it comes in contact with almost all the surface of the portion defining the bottom portion of the lower metal mold.

This suppresses the occurrence of uneven molecular orientation caused as the molten resin mass is partly cooled, and makes it possible to impart nearly isotropic orientation.

Figure 6:
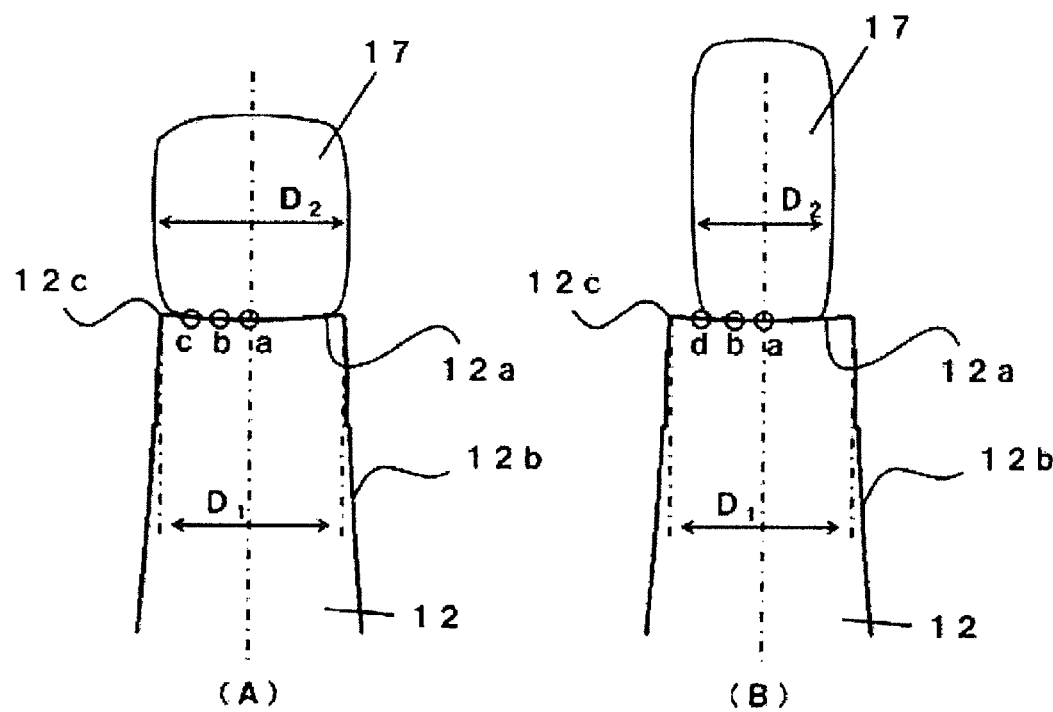
FIGS. 6(A) and 6(B) are views illustrating the states where the molten resin masses are fed into the lower metal molds.

FIG. 6 is a view illustrating the states where the molten resin masses are fed into the lower metal molds, wherein the lower metal mold is a male metal mold, the top plate portion is a portion 12a that defines the bottom portion, and the side surface is a portion 12b that defines the body portion.

Referring to FIG. 6(B), if the diameter D2 of the molten resin mass 17 is smaller than the diameter of the portion 12a that defines the bottom portion of the lower metal mold 12, then the molten resin mass at a point d in FIG. 6 comes in contact with the surface of the metal mold for the first time after it is compressed by the upper metal mold (not shown). At the center a of the bottom and at a point b, on the other hand, the molten resin mass has already been in contact with the surface of the metal mold since when it was fed and has, therefore, been cooled. Therefore, the resin has dissimilar fluidities depending on the point d and the point b, and the molecular orientation becomes different depending on the outer circumferential side of the bottom portion and the central side thereof.

Referring to FIG. 6(A), on the other hand, if the diameter D2 of the molten resin mass 17 is set to be nearly the same as the diameter of the portion 12a that defines the bottom portion of the lower metal mold 12 so that the molten resin mass 17 comes in contact with nearly the whole area of the portion 12a that defines the bottom portion of the lower metal mold, then the molten resin that forms the bottom portion is not subject to be locally cooled. Accordingly, the molten resin mass can be compressed under similar conditions irrespective of the point b or the point c remote from the central point a, and no difference occurs in the molecular orientation irrespective of the point b or the point c.

In the invention, it is desired that the diameter of the molten resin mass is based on the strand diameter (D2) of the preset molten resin, and is compared with the diameter (D1) at a position corresponding to the outermost end of the grounding portion of the cup-type container in the lower metal mold.

Desirably, the ratio of diameter of the molten resin mass to the diameter of the lower metal mold remains nearly the same so that the molten resin mass comes in contact as much as possible with the whole portion that is defining the bottom portion of the lower metal mold. This, however, differs depending on the shape of the metal mold. For instance, if the lower metal mold to which the molten resin mass is fed is of the type different from that of the female metal mold, it becomes probable that the molten resin mass may come into contact with a portion (side surface of the cavity) that defines the body portion. It is, therefore, desired that the ratio D2/D1 is in a range of 0.95 to 0.7. If the lower metal mold is of the type that becomes the male metal mold, there is no such limitation and, therefore, the ratio D2/D1 should desirably lie in a range of 1 to 0.7.

Figure 7:
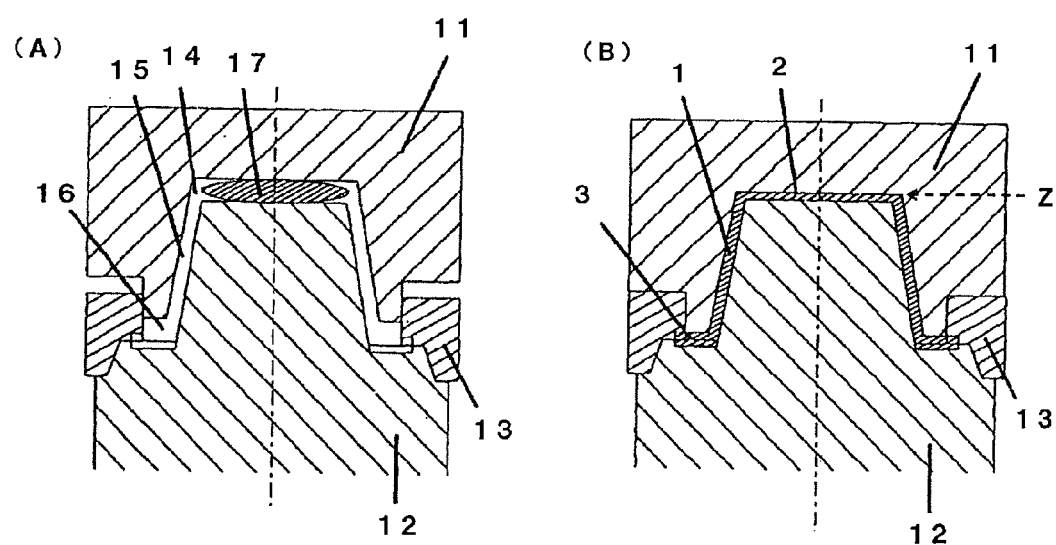
FIGS. 7(A) and 7(B) are views illustrating another forming method of the present invention.

Even in case the lower metal mold is the male metal mold having the core and the upper metal mold is the female metal mold having the cavity as shown in FIG. 7, it is desired that a portion that becomes an end of the opening or a part thereof (flange-forming portion in FIG. 7) is defined by using the metal mold 13 that defines the flange-forming space (FIG. 7(A)) prior to pushing the molten resin mass 17 fed onto the lower metal mold (male metal mold) 12 by lowering the upper metal mold (male metal mold) 11. Next, as the core metal mold 12 is further lowered, the thicknesses of the bottom-forming space 14 and of the body-forming space 15 defined by the cavity 11 and the core metal mold 12 are gradually varied so that the thickness of the body portion is finally defined.

In the method of forming the cup-type container of the present invention, it is particularly desired that the molten resin mass which is in the molten state is a molten resin mass having a multi-layer structure extruded by a die head having a multi-layer structure. That is, the strand having the multi-layer structure extruded by the die head having the multi-layer structure is cut by a cutting means of a synthetic resin feeding apparatus. The molten resin mass that is cut is covered at its cutting end with the outer layer, and is formed into a molten resin mass having the multi-layer structure that includes a core layer located at the center and shell layers wrapping the core layer therein. Despite the molten resin mass having the above multi-layer structure is compression-formed, the intermediate layer is not exposed to the surface, and there is no need of taking into account the hygienic property of the resin used as the intermediate layer.

For instance, if the desired cup-type container has a two-kind-three-layer multi-layer structure using the polypropylene as the inner and outer layers and using the barrier resin as the intermediate layer, the molten resin mass may comprise the core layer of the barrier resin and the shell layers of the polypropylene.

EXAMPLES

The invention will be further described by way of the Examples.

1. Measuring the Half-Value Width at a Half Peak.
(1) Measuring Apparatus and Measuring Conditions. Transmission Type Small X-Ray Diffraction
    apparatus RAD-RB (manufactured by Rigaku Co.)
    Target: Cu,
    Filter: Ni
    Detector: goniometer PSPC MDG
    Counting gas: Ar 90%+$CH_4$ 10%,
    Counting gas pressure: 180 $kgf/cm^2$
    Voltage: 30 kV,
    Current: 90 mA,
    Scanning rate: 2°/min.
    Step width: 0.081°,
    Measuring time: 600 seconds
(2) Calculating the Half-Value Width at a Half Peak by Measuring the X-Ray Diffraction Intensities.

A test piece was cut out from the body portion of the cup-type container, and the direction of height thereof was denoted by x and the circumferential direction by y. By using the measuring apparatus mentioned above, the diffraction intensities were measured by causing an X-ray to be incident on a plane x-y of the test piece at right angles thereto.

Here, in a peak intensity profile in the x-direction of a Debye's ring that was obtained, the half-value width at a half peak of Miller index was measured at a diffraction angle $2\theta=14.5°$ that represented the diffraction by the crystal plane (110). The number of the samples measured was N=3, and an average value thereof was regarded to be a measured result.

Here, if a line is drawn in parallel with the abscissa passing through a point one-half the peak intensity of the Miller index at a diffraction angle $2\theta=14.5°$ representing the diffraction by the crystal plane (110), the half-value width is the width between the two points at where the parallel line intersects the peak curve.

In measuring the half-value width at a half peak, in order to exclude the effect of X-ray scattering caused by the air during the measurement, the air scattering value measured in the absence of the test piece was subtracted from the measured values to thereby find the half-value width at a half peak due purely the test piece only.

The test piece was cut in a square shape having a side of 10 mm such that the height h of the cup-type container above the ground surface was the center of the test piece.

Figure 8:
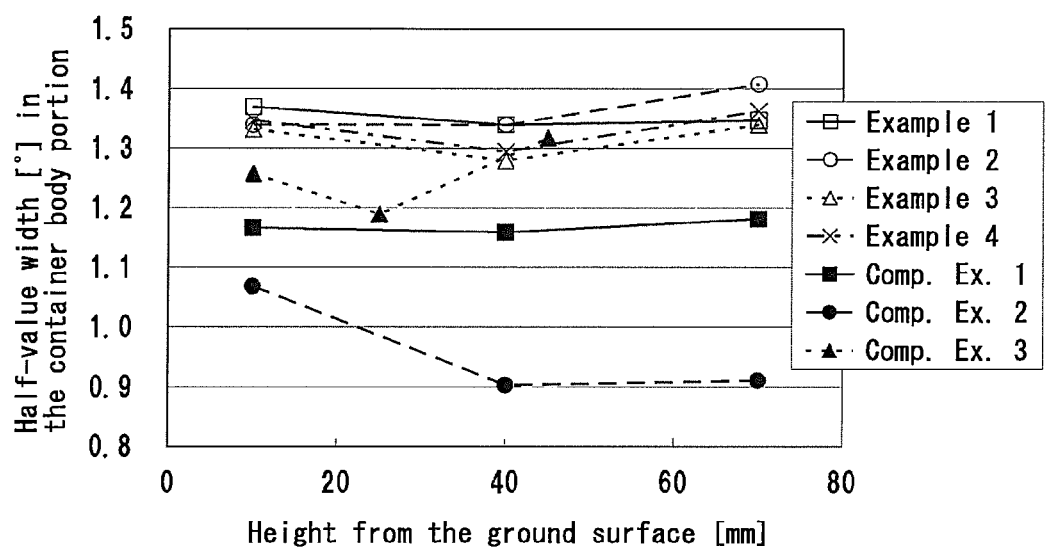
FIG. 8 is a diagram showing have-value widths at half peak corresponding to the heights of the cup-type containers under each of the conditions.

The results were as shown in Table 1 and FIG. 8.

(3) Calculating the half-value width at a half peak and the rate of change in the half-value width in the bottom portion by measuring the X-ray diffraction intensities.

A test piece was cut out from the bottom portion of the cup-type container, and the radial direction thereof was denoted by x and the circumferential direction by y. By using the measuring apparatus mentioned above, the diffraction intensities were measured by causing the X-ray to be incident on a plane x-y of the test piece at right angles thereto. The half-value width at a half peak was found by the same method as that of the case of the body portion.

Figure 13:
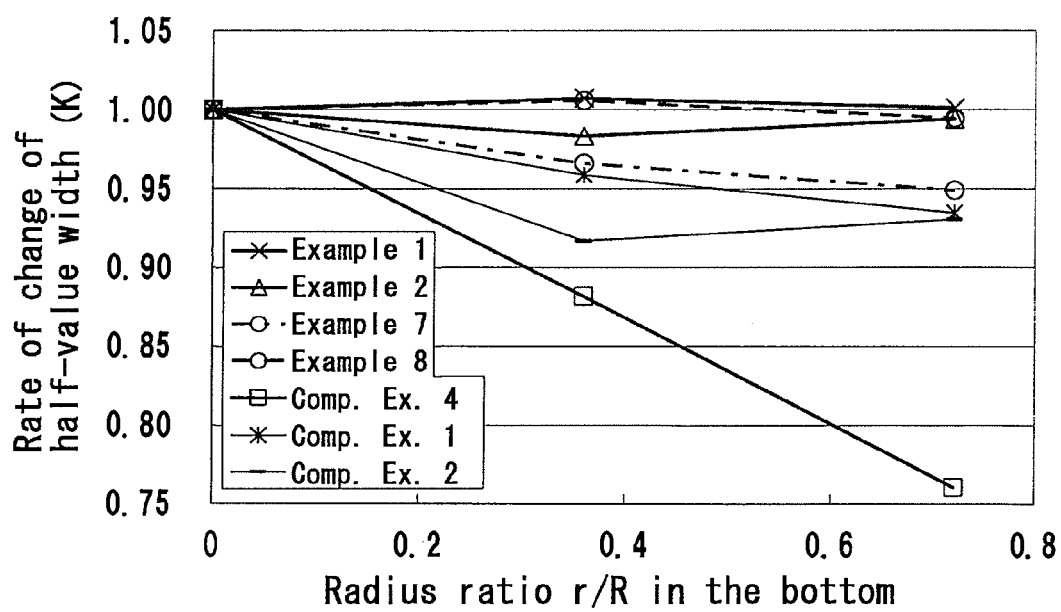
FIG. 13 is a diagram showing rates of change K of the half-value widths corresponding to the radius ratios r/R in the bottom portions of the cup-type containers under each of the conditions.

The results of the half-value widths at a half peak were as shown in Table 6(A), while the results of the rates of change K in the half-value widths at half peaks were as shown in Table 6(B) and FIG. 13.

2. Evaluating the Heat Shrinkage.
(1) Calculating the Heat Shrinkage in the Body Portion of the Cup-Type Container.

By using an autoclave (SS-325 manufactured by Tommy Kogyo K.K.), a cup-type container was heated under the conditions of 95° C. for 30 minutes, and the fully poured capacities were measured before and after the heating to calculate the rate of change before and after the heating. The number of the samples was N=3, and an average value thereof was regarded to be the measured result.

Figure 9:
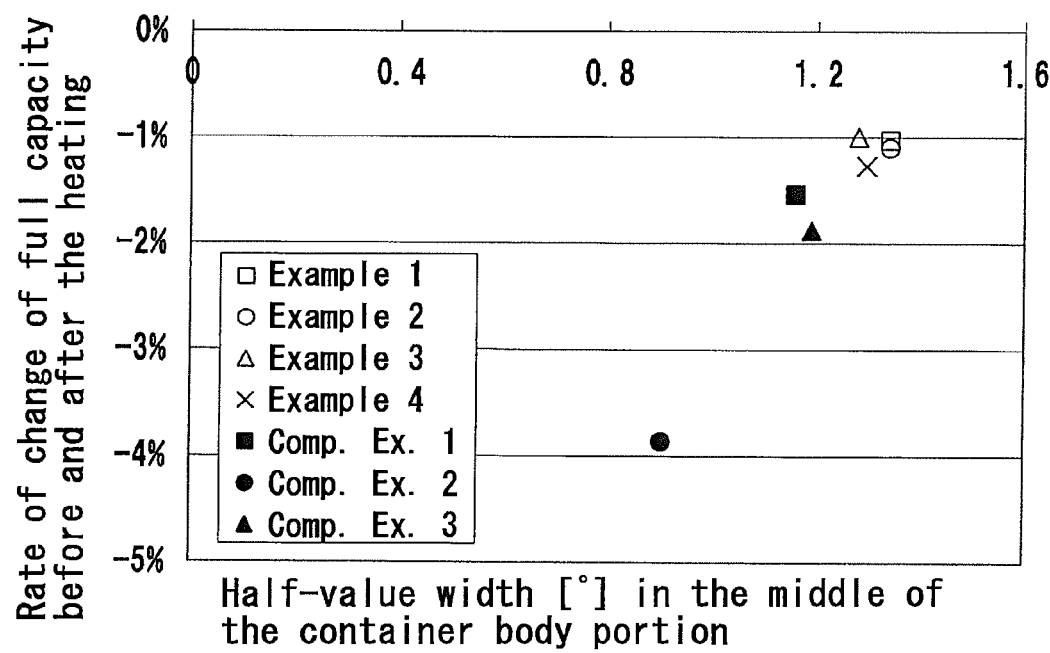
FIG. 9 is a diagram in which the ordinate represents rates of change in the full capacities of the cup-type containers of before and after they are heated, and the abscissa represents half-value widths in the intermediate portions of the body portions of the cup-type containers (at a height of 40 mm from the ground surface in Examples 1 to 4 and in Comparative Examples 1 and 2, and at a height of 25 mm from the ground surface in Comparative Example 3) under each of the conditions.

The results were as shown in Table 2 and FIG. 9.

(2) Calculating the Heat Shrinkage in the Bottom Portion of the Cup-Type Container.

The bottom portion only was cut out from the cup-type container, heated under the above-mentioned conditions, and was measured for its thicknesses at four places of the radius ratios r/R of 0, 0.36, 0.72 and 0.9 before and after the heating to calculate the rates of change.

The number of the samples measured was N=3, and an average value thereof was regarded to be the measured result. Here, at three places of the ratios r/R of 0.36, 0.72 and 0.9, the thicknesses were found by averaging the measurements at 8 points.

Figure 14:
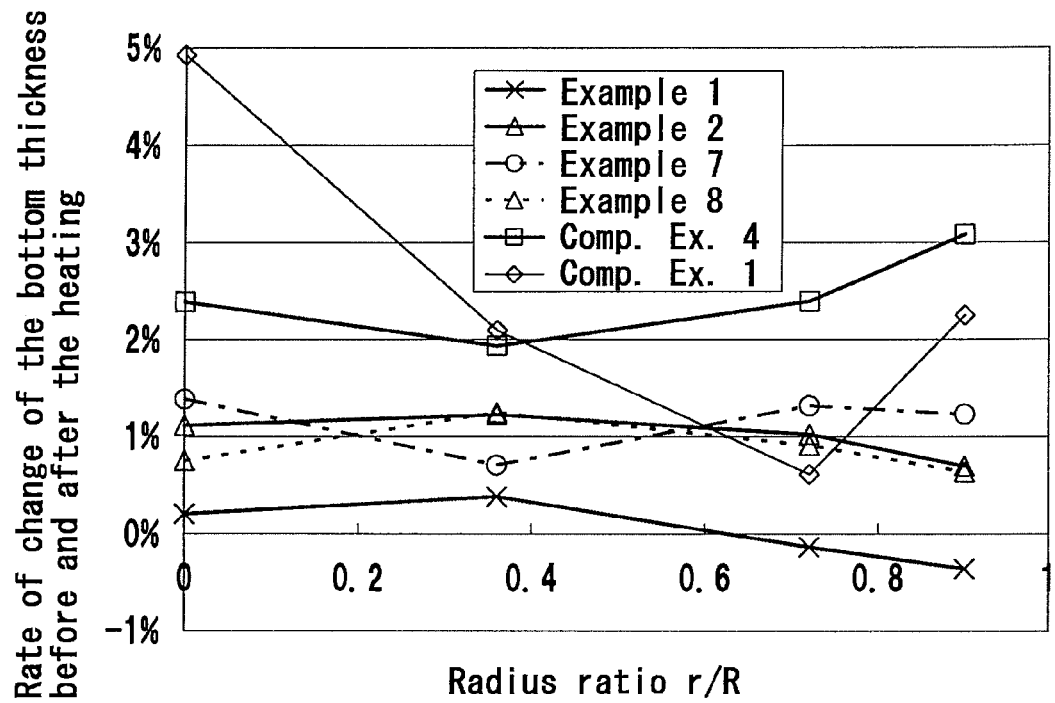
FIG. 14 is a diagram showing rates of change of the thicknesses before and after the cup-type containers are heated under each of the conditions.

The results were as shown in Table 7 and FIG. 14.

3. Evaluating the Positions where the Intermediate Layer that Extended has Reached.

Figure 4:
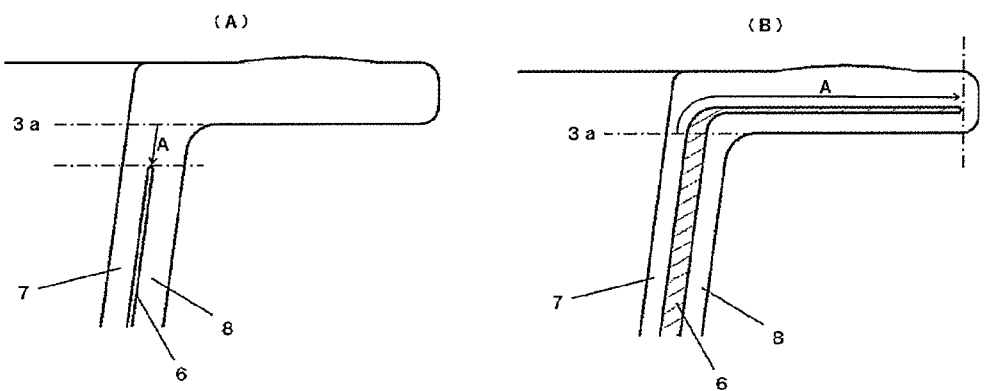
FIGS. 4(A) and 4(B) are views illustrating a method of measuring the position where the intermediate layer has reached.

A vicinity of the flange portion of the cup-type container was equally cut in 8 directions in parallel in the direction of height, and the cut surfaces were trimmed. Thereafter, an iodine solution was applied to dye the ethylene-vinyl alcohol copolymer resin of the intermediate layer. The cut surfaces were observed by using a graduated magnifying glass to measure the positions where the intermediate layer has reached. The number of the samples was N=3, and an average value thereof was regarded to be the measured result. By regarding the position 3a in FIG. 4 as a reference of position where the intermediate layer has reached, negative notations represent the cases where the ethylene-vinyl alcohol copolymer resin did not reach the position 3a as shown in FIG. 4(A) and positive notations represent the cases where the ethylene-vinyl alcohol copolymer resin has extended beyond the position 3a as shown in FIG. 4(B).

Figure 10:
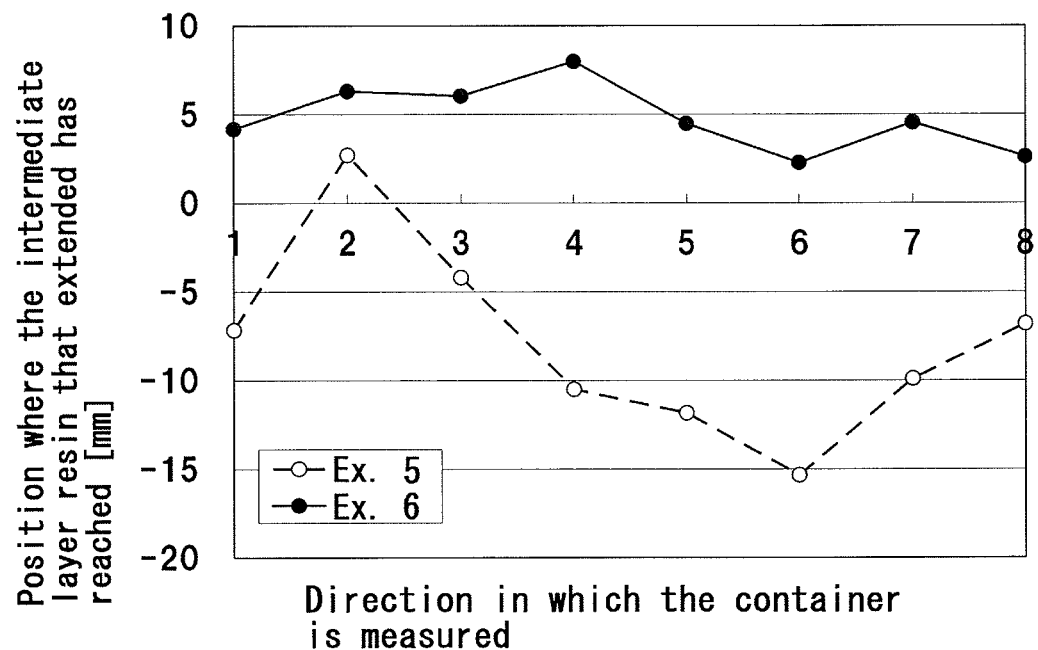
FIG. 10 is a diagram showing the positions where the resins of intermediate layers of the cup-type containers that extended have reached under each of the conditions.

The results were as shown in Table 3 and FIG. 10.

4. Evaluating the Position of the Intermediate Layer in the Direction of Thickness.

The cup-type container was cut in the direction of height from the flange toward the bottom portion, and the cut surfaces were trimmed. Thereafter, the iodine solution was applied to dye the ethylene-vinyl alcohol copolymer resin of the intermediate layer. The cut surfaces were observed by using a digital camera-incorporating stereoscopic microscope (LEICA EZ4 uD) (Leica Microsystems Co.) to measure $t_2$ and $t_3$ in FIG. 1 in order to find a thickness ratio (often referred to as inner layer thickness ratio) C at the position of the intermediate layer from the inner surface of the container in the direction of the thickness in compliance with the following formula (2). The number of the samples was N=1.

$$C=(t_2+t_3/2)/t \qquad (2)$$

Figure 11:
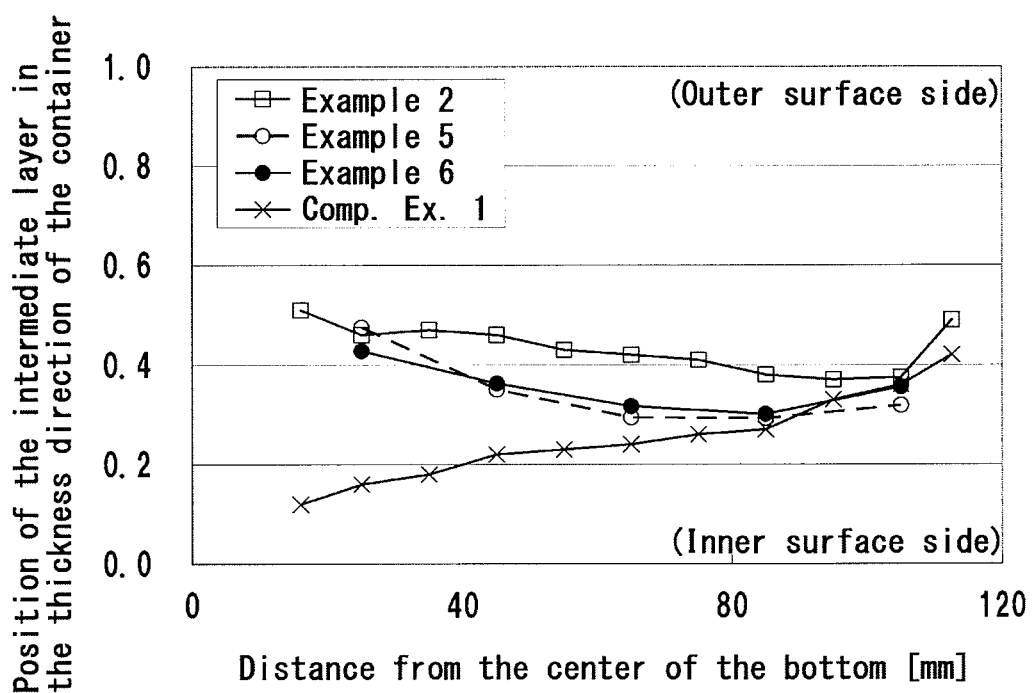
FIG. 11 is a diagram showing thickness ratios C at the positions of the intermediate layers from the inner surface of the cup-type containers under each of the conditions.

The results were as shown in Table 4 and FIG. 11.

5. Evaluating the Oxygen-Barrier Property.

The cup-type container was fully filled with water and was boiled and sterilized under a condition of 80° C.-30 minutes. Thereafter, the cup-type container was stored for a predetermined period of time in an environment of 30° C.-40±10% RH, and an oxygen concentration in the container was measured by using a CheckMate 9900 (PBI DANSENSOR Co.). The storage terms were 1, 14 and 30 days. The number of the samples was N=5, and an average value thereof was regarded as the measured results.

Figure 12:
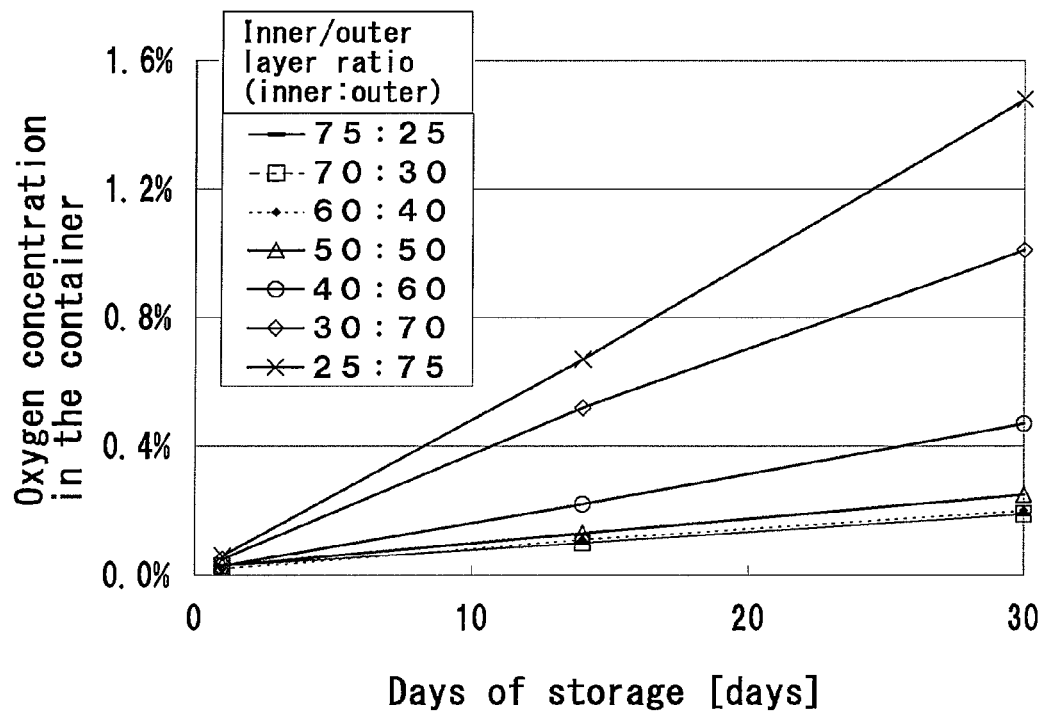
FIG. 12 is a diagram showing oxygen concentrations in the containers at each of the inner/outer layer ratios of the multi-layer pressure-formed containers varying the position of the intermediate member.

The results were as shown in Table 5 and FIG. 12.

6. Evaluating the Shatter Strength.

The cup-type container was fully filled with water, heat-sealed with a lid member and was, thereafter, stored for one day in an environment of a temperature of 23° C. and a humidity of 50%. Thereafter, with the bottom facing downward, the container was allowed to fall down one time from a height of 50 cm. The container, when it was not shattered, was caused again to fall down from a height of 80 cm. The shatter strength was evaluated based on the height the container was shattered. Here, the container was shattered means that the water filled in the container has leaked.

Figure 15:
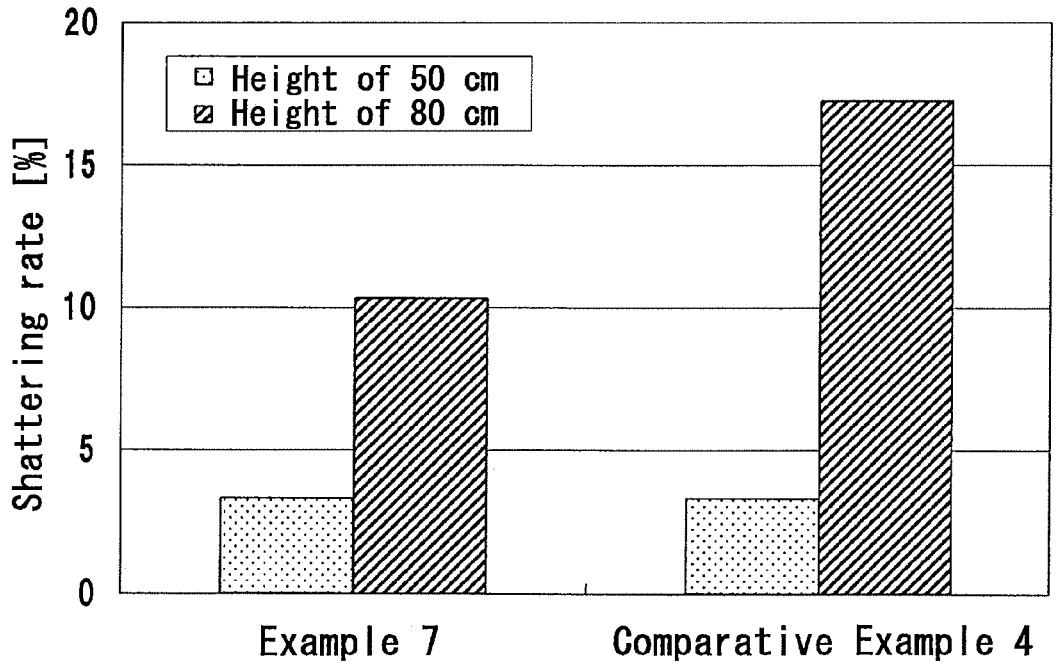
FIG. 15 is a graph showing cracking tendencies of when the cup-type containers are fallen down under each of the conditions.

The results were as shown in Table 8 and FIG. 15.

Example 1

Figure 5:
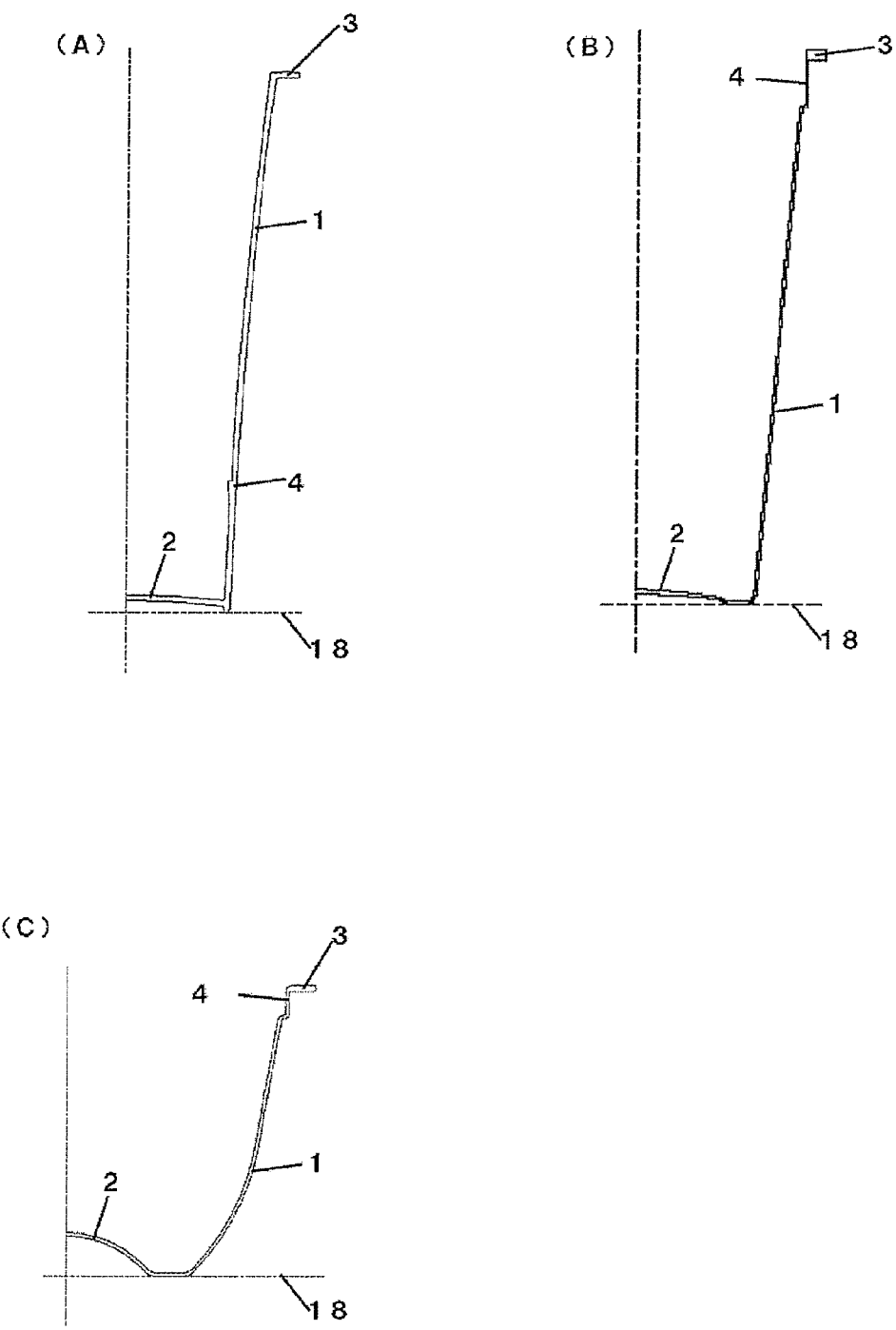
FIGS. 5(A), 5(B), and 5(C) include a sectional view FIG. 5(A) of the containers of Examples 1 to 6 and Comparative Example 1, a sectional view FIG. 5(B) of the container of Comparative Example 2, and a sectional view FIG. 5(C) of the container of Comparative Example 3.

A random polypropylene resin (MFR 30 g/10 min) was fed into a φ65 extruder (L/D=30), extruded through a nozzle of an outlet diameter of φ27 under the conditions of an extruder temperature of 230° C., die temperature of 230° C. and a resin pressure of 9.0 MPa, and was cut to obtain a molten resin mass. The molten resin mass was fed into a compression metal mold maintained at 18° C., compression-formed while defining, in advance, part of the flange, varying the thicknesses of the body portion of the container and of the portion that forms the bottom and controlling the forming rate to be 100 mm/sec at a point 5 mm before the point where the forming was completed to thereby obtain a single-layer cup-type container of a sectional structure as shown in FIG. 5(A) having a ratio L/D=1.6, a thickness in the body portion of the container of 1.0 to 1.6 mm, a container height of 95 mm, a container flange outer diameter of 59.3 mm, a volume of 120 cc and a weight of 12.8 g.

Next, the single-layer cup-type container was found for its half-value width at a half peak to evaluate its heat shrinkage.

Example 2

As a resin for forming inner and outer layers, a random polypropylene resin (MFR 30 g/10 min) was fed into the φ65 extruder (L/D=30), and was extruded under the conditions of an extruder temperature of 230° C. and a resin pressure of 9.0 MPa.

Further, an ethylene-vinyl alcohol copolymer resin was fed into a φ30 extruder (L/D=25) and was extruded under the conditions of an extruder temperature of 230° C. and a resin pressure of 30.0 MPa.

As an adhesive resin for adhering the intermediate layer to the inner and outer layers, further, a modified polypropylene resin was fed into a φ30 extruder (L/D=25) and was extruded under the conditions of an extruder temperature of 230° C. and a resin pressure of 22.0 MPa.

The inner and outer layers, intermediate layer and adhesive resin were met together in a die heated at 230° C., extruded through a nozzle of an outlet diameter of φ27, and was cut to obtain a multi-layer molten resin mass.

The multi-layer molten resin mass was compression-formed under the same conditions as in Example 1 to obtain a multi-layer cup-type container of the same shape as that of Example 1 and having a constitution in which the inner and outer layers were formed of the random polypropylene resin, the intermediate layer was formed of the ethylene-vinyl alcohol copolymer resin, and the adhesive layers among the inner and outer layers and the intermediate layer were formed of the modified polypropylene resin.

Next, the multi-layer cup-type container was found for its half-value width at a half peak to evaluate its heat shrinkage and the position to where the intermediate layer has extended.

Example 3

A random polypropylene resin (MFR 22 g/10 min) was fed into a φ75 extruder (L/D=30), extruded through a nozzle of an outlet diameter of φ27 under the conditions of an extruder temperature of 220° C., a die temperature of 220° C. and a resin pressure of 1.2 MPa, and was cut to obtain a molten resin mass. The molten resin mass was compression-formed under the same forming conditions as those of Example 1 except that the temperature was 20° C. in the compression metal mold to which the molten resin mass was fed, and the forming rate was 300 mm/sec at a point 5 mm before the point where the forming was completed. There was obtained a single-layer cup-type container of the same shape as that of Example 1, which was then measured and evaluated in the same manner as in Example 1.

Example 4

By using the random polypropylene resin (MFR 22 g/10 min), there was obtained a molten resin mass in the same manner as in Example 3. The molten resin mass was compression-formed under the same forming conditions as those of Example 1 (specifically, the forming rate was 100 mm/sec at a point 5 mm before the point where the forming was completed) except that the temperature was 20° C. in the compression metal mold to which the molten resin mass was fed. There was obtained a single-layer cup-type container of the same shape as that of Example 1, which was then measured and evaluated in the same manner as in Example 1.

Example 5

As a resin for forming inner and outer layers, the random polypropylene resin (MFR 22 g/10 min) was fed into a φ75 extruder (L/D=30), and was extruded under the conditions of an extruder temperature of 220° C. and a resin pressure of 1.2 MPa.

Further, an ethylene-vinyl alcohol copolymer resin was fed into a φ25 extruder (L/D=25) and was extruded under the conditions of an extruder temperature of 220° C. and a resin pressure of 2 MPa.

As an adhesive resin for adhering the intermediate layer to the inner and outer layers, further, a modified polypropylene resin was fed into the φ30 extruder (L/D=25) and was extruded under the conditions of an extruder temperature of 220° C. and a resin pressure of 4.8 MPa.

The inner and outer layers, intermediate layer and adhesive resin were met together in a die heated at 230° C., and was cut to obtain a multi-layer molten resin mass.

The multi-layer molten resin mass was compression-formed under the same conditions as in Example 3 except that the forming rate was 130 mm/sec at a point 5 mm before the point where the forming was completed to obtain a multi-layer cup-type container of the same shape as that of Example 1 and having a constitution in which the inner and outer layers were formed of the random polypropylene resin, the intermediate layer was formed of the ethylene-vinyl alcohol copolymer resin, and the adhesive layers among the inner and outer layers and the intermediate layer were formed of the modified polypropylene resin. Next, the multi-layer cup-type container was evaluated for its position to where the intermediate layer has extended.

Example 6

A multi-layer molten resin mass was obtained in the same manner as in Example 5 and was compression-formed under the same forming conditions as in Example 3 except that the forming rate was 40 mm/sec at a point 5 mm before the point where the forming was completed to obtain a multi-layer cup-type container of the same shape as that of Example 5. Next, the multi-layer cup-type container was evaluated in the same manner as in Example 5.

Example 7

A random polypropylene resin (MFR 10 g/10 min) was used and was extruded through a nozzle of an outlet diameter of φ27 under the same conditions as those of Example 3, and was cut to obtain a molten resin mass. The molten resin mass was compression-formed under the same conditions as those of Example 6 to obtain a single-layer cup-type container having the same shape as that of Example 1 and weighing 11 g. Next, the single-layer cup-type container was measured and evaluated in the same manner as in Example 1.

Example 8

A random polypropylene resin (MFR 22 g/10 min) was used and was extruded through a nozzle of an outlet diameter of φ32 under the same conditions as those of Example 3, and was cut to obtain a molten resin mass. The molten resin mass was compression-formed under the same conditions as those of Example 6 to obtain a single-layer cup-type container having a sectional structure as shown in FIG. 5(C) and having a thickness of 0.6 mm to 0.8 mm in the body portion of the container, a container height of 98.5 mm, a container flange outer diameter of 81 mm, a capacity of 135 cc and a weight of 8 g. Next, the single-layer cup-type container was measured for its X-ray diffraction intensity.

Comparative Example 1

A commercially available polypropylene multi-layer injection-formed cup-type container having the same shape as that of Example 1 and having inner and outer layers of a random polypropylene resin, was measured and evaluated in the same manner as in Example 2.

Comparative Example 2

A commercially available homopolypropylene multi-layer pressure-formed cup-type container having the sectional structure as shown in FIG. 5(B) and having a thickness of 0.5 mm in the body portion of the container, a container height of 115 mm, a container flange outer diameter of 76 mm, and a capacity of 280 cc, was measured and evaluated in the same manner as in Example 1.

Comparative Example 3

A random polypropylene resin (MFR 22 g/10 min) was fed into a $\phi$75 extruder (L/D=30), extruded under the conditions of an extruder temperature of 220° C., a die temperature of 220° C. and a resin pressure of 1.2 MPa, and was cut to obtain a molten resin mass. The molten resin mass was compression-formed under the conditions same as those of Example 3 to obtain a single-layer cup-type container having the sectional structure as shown in FIG. 5(C) and having L/D=0.6, a thickness of 0.6 mm to 0.8 mm in the body portion of the container, a container height of 48.39 mm, a container flange outer diameter of 81.13 mm, a capacity of 135 cc and a weight of 8 g. Next, the single-layer cup-type container was measured and evaluated in the same manner as in Example 1.

Comparative Example 4

A random polypropylene resin (MFR 10 g/10 min) was used and was extruded through a nozzle of an outlet diameter of $\phi$20 under the same conditions as those of Example 3, and was cut to obtain a molten resin mass. The molten resin mass was compression-formed under the same conditions as those of Example 3 to obtain a single-layer cup-type container having the same shape as that of Example 3. Next, the single-layer cup-type container was measured and evaluated in the same manner as in Example 1.

[Experiment]

There were pressure-formed polypropylene multi-layer cup-type containers having a container flange outer diameter of 75 mm and a capacity of 100 cc while varying the inner layer/outer layer ratio at the position of the intermediate layer in cross section of the container as shown in Table 5. The oxygen concentrations in the containers were evaluated depending on the respective inner layer/outer layer ratios.

In the cup-type containers, the inner and outer layers were formed by using the polypropylene resin, the intermediate layer was formed by using the ethylene-vinyl alcohol copolymer resin, and the adhesive layers among the inner and outer layers and the intermediate layer were formed by using the modified polypropylene resin. The thickness of the intermediate layer was maintained constant in all of these containers.

In Table 1 below, the half-value width of the main body portion at various heights from the ground surface are provided for listed examples.

TABLE 1

| Half-value width | Height from the ground surface [mm] | | | | |
|---|---|---|---|---|---|
| | 10 | 25 | 40 | 45 | 70 |
| Example 1 | 1.37 | — | 1.34 | — | 1.35 |
| Example 2 | 1.34 | — | 1.34 | — | 1.41 |
| Example 3 | 1.33 | — | 1.28 | — | 1.34 |
| Example 4 | 1.35 | — | 1.29 | — | 1.36 |
| Comp. Ex. 1 | 1.17 | — | 1.16 | — | 1.18 |
| Comp. Ex. 2 | 1.09 | — | 0.90 | — | 0.91 |
| Comp. Ex. 3 | 1.09 | 1.26 | — | 1.32 | — |

TABLE 2

| | Rate of change in full capacity before and after the heating | Rate of change [%] |
|---|---|---|
| Example 1 | | −1.03 |
| Example 2 | | −1.00 |
| Example 3 | | −1.00 |
| Example 4 | | −1.27 |
| Comp. Ex. 1 | | −1.54 |
| Comp. Ex. 2 | | −3.86 |
| Comp. Ex. 3 | | −1.88 |

TABLE 3

| Position to where the intermediate layer has extended [mm] | Direction of measurement | | | | | | | | |
|---|---|---|---|---|---|---|---|---|---|
| | 1 | 2 | 3 | 4 | 5 | 6 | 7 | 8 | Average |
| Example 5 | −7.2 | +2.7 | −4.2 | −10.5 | −11.8 | −15.3 | −9.9 | −6.8 | −7.9 |
| Example 6 | +4.2 | +6.3 | +6.0 | +8.0 | +4.5 | +2.3 | +4.5 | +2.6 | +4.8 |

TABLE 4

| Inner layer thickness ratio C of container barrier layer | Distance from the center of the bottom [mm] | | | | | | |
|---|---|---|---|---|---|---|---|
| | 10 | 25 | 45 | 65 | 85 | 105 | 115 |
| Example 2 | 0.58 | 0.46 | 0.46 | 0.42 | 0.38 | 0.38 | — |
| Example 5 | 0.57 | 0.48 | 0.35 | 0.29 | 0.29 | 0.32 | — |
| Example 6 | 0.54 | 0.43 | 0.36 | 0.32 | 0.30 | 0.36 | 0.56 |
| Comp. Ex. 1 | 0.15 | 0.16 | 0.22 | 0.24 | 0.27 | 0.36 | 0.58 |

TABLE 5

Oxygen concentration in the container depending on inner/outer layer ratio of the container

| Inner layer/outer layer ratio of the container | Days of storage | | |
|---|---|---|---|
| (inner:outer) | 1 Day | 14 Days | 30 Days |
| 75:25 | 0.03% | 0.10% | 0.19% |
| 70:30 | 0.03% | 0.10% | 0.19% |
| 60:40 | 0.02% | 0.11% | 0.20% |
| 50:50 | 0.03% | 0.13% | 0.25% |
| 40:60 | 0.03% | 0.22% | 0.47% |
| 30:70 | 0.05% | 0.52% | 1.01% |
| 25:75 | 0.06% | 0.67% | 1.48% |

TABLE 6

(A)

| Half-value width in the bottom portion | Radius ratio r/R from the center of the bottom | | |
|---|---|---|---|
| | 0 | 0.36 | 0.72 |
| Example 1 | 1.30 | 1.31 | 1.30 |
| Example 2 | 1.35 | 1.32 | 1.34 |
| Example 7 | 1.32 | 1.28 | 1.26 |
| Example 8 | 1.39 | 1.40 | 1.38 |
| Comp. Example 1 | 1.27 | 1.22 | 1.19 |
| Comp. Example 2 | 1.09 | 1.00 | 1.02 |
| Comp. Example 4 | 1.31 | 1.15 | 0.99 |

(B)

| Rate of change of half-value width in the bottom portion | Radius ratio r/R from the center of the bottom | | |
|---|---|---|---|
| | 0 | 0.36 | 0.72 |
| Example 1 | 1.00 | 1.01 | 1.00 |
| Example 2 | 1.00 | 0.98 | 0.99 |
| Example 7 | 1.00 | 0.97 | 0.95 |
| Example 8 | 1.00 | 1.01 | 0.99 |
| Comp. Example 1 | 1.00 | 0.96 | 0.93 |
| Comp. Example 2 | 1.00 | 0.92 | 0.93 |
| Comp. Example 4 | 1.00 | 0.88 | 0.76 |

TABLE 7

| Rate of change of thickness before and after the heating | Radius ratio r/R from the center of the bottom | | | |
|---|---|---|---|---|
| | 0 | 0.36 | 0.72 | 0.90 |
| Example 1 | +0.205 | +0.383 | −0.133 | −0.358 |
| Example 2 | +1.114 | +1.222 | +1.024 | +0.697 |
| Example 7 | +1.385 | +0.708 | +1.316 | +1.229 |
| Comp. Ex. 4 | +2.386 | +1.930 | +2.392 | +3.078 |

TABLE 8

| Shattered container bottom portion | Falling height, 50 mm | | Falling height, 80 mm | |
|---|---|---|---|---|
| | Number shattered/ total number | Shattering rate [%] | Number shattered/ total number | Shattering rate [%] |
| Example 7 | 1/30 | 3.33 | 3/29 | 10.34 |
| Comp. Ex. 4 | 1/30 | 3.33 | 5/29 | 17.24 |

(Consideration)

In the case of the cup-type container having L/D which is not so large but is about 1.0 as shown in FIG. 5(C), the resin of the intermediate layer can be extended up to a proper position despite the forming rate is as described in Example 5. In the case of the cup-type container having L/D which is obviously larger than 1.0 as shown in FIG. 5(A), it is difficult to extend the resin of the intermediate layer up to the proper position if the forming rate is as described in Example 5. As will be obvious from FIG. 10, however, upon lowering the forming rate, it becomes possible to further extend the resin of the intermediate layer. Namely, the position to where the resin of the intermediate layer extends can be controlled depending upon the rate of forming.

In Examples 2, 5 and 6, the molten resins are compression-formed and the intermediate layer is present in nearly the middle of the container near the bottom. As the fluidizing distance increases, however, the molten resin deviates toward the inner surface side. Near the flange, the molten resin flows again toward the outer surface. As a whole, therefore, the intermediate layer is present at a position of an inner layer thickness ratio of 0.3 to 0.5. By controlling the position of the resin of the intermediate layer in a state of the molten resin mass of before the compression forming, further, it is allowed to control the position of the intermediate layer to some extent in the cup-type container after it has been formed.

In Comparative Example 1, on the other hand, the molten resin is injection-formed and, therefore, the intermediate layer injected from the gate is present at a position very close to the inner surface near the bottom. The resin as it further flows tends to approach the outer surface. As a whole, therefore, the inner layer thickness ratio assumes a value of not larger than 0.5.

As the intermediate layer becomes closer to the inner surface, it will be learned that the oxygen-barrier property decreases being affected by the water of the content. Considering from the results of the inner layer thickness ratios C, the cup-type container injection-formed like in Comparative Example 1 has the intermediate layer that is close to the inner surface. Being affected by the water of the content, therefore, the oxygen-barrier property of the intermediate layer decreases. On the other hand, the cup-type containers compression-formed as in Examples 2, 5 and 6 have an intermediate layer positioned more away from the inner surface than in Comparative Example 1. Therefore, it is considered that the intermediate layer is less affected by the water of the content and permits the oxygen-barrier property to decrease little.

From FIG. 9 and Table 1, further, the smaller the half-value width in the body portion, i.e., the more the molecules are oriented, it will be learned that the container shrinks upon the heating. This is presumed to be that the molecular orientation is relaxed by the heating.

Referring to FIG. 14, further, if the molecules are evenly oriented but in a suppressed manner over the whole bottom as in Examples 1, 2, 7 and 8, then the rate of change of thickness is not more than 1.5% despite the cup-type container is heated. In Comparative Example 4, on the other hand, the molecules are oriented in the portions close to the end of the bottom, and there is a portion where the rate of change is not less than 2%. Further, if the molecules are oriented over the whole bottom as in Comparative Example 1, the thickness varies greatly depending on the positions where the bottom portion was measured.

As will be obvious from FIG. 15, the cup-type container of Example 7 has molecules that are more evenly oriented over the whole bottom than that of Comparative Example 4, and has a large shatter strength and does not easily break.

INDUSTRIAL APPLICABILITY

Owing to its excellent mechanical strengths such as heat resistance and shatter strength of the bottom portion as well as excellent transparency and gas-barrier property, the cup-type container of the invention can be favorably used for containing, specifically, beverages and foods.

Moreover, the cup-type container features excellent dimensional precision and forms a thick stacking portion. Therefore, the cup-type containers of the invention can be stacked one upon the other in a plural number, and can be effectively used for containing general-purpose products that are mass-produced.

DESCRIPTION OF REFERENCE NUMERALS

1: body portion 2: bottom portion 3: flange portion
4: stacking portion 5: leg portion
6: intermediate layer 7: inner layer 8: outer layer
9: body portion 11: lower metal mold (female mold)
12: upper metal mold (male mold)
13: metal mold for defining flange-forming space
14: space for forming bottom portion
15: space for forming body portion
16: space for forming product flange portion
17: molten resin mass
18: ground surface on where the product is erected

The invention claimed is:

1. A compression-formed thermoplastic resin container comprising:
   at least a flange portion;
   an opening having a diameter (D);
   a body portion;
   a bottom portion; and
   a container height (L),
   wherein a ratio (L/D) of the container height (L) to the diameter (D) of the opening is not less than 1.0, and
   wherein, when a direction of height of a test piece cut out from the body portion of the container is denoted by "x" and a circumferential direction thereof by "y", a half-value width (P) at a half peak of a Miller index at a diffraction angle 2θ=14.5° that represents a diffraction by a crystal plane (110), is in a range of 1.25 to 1.5 over a whole of the body portion in a peak intensity profile in a direction of height (x-direction) of a Debye's ring obtained by measuring diffraction intensities by causing X-rays to be incident on an x-y plane of the test piece at right angles thereto.

2. A compression-formed thermoplastic resin container comprising:
   at least a flange portion;
   a body portion; and
   a bottom portion,
   wherein a rate of change (K) of half-peak widths is represented by formula $K=P_2/P_1$, with K being in the range of 0.95 to 1.05, with $P_1$ being a half-peak width at a measuring point at a center of the bottom portion and with $P_2$ being a half-peak width at a measuring point on the bottom portion,
   wherein, when a radius of the bottom portion is denoted by "R" and a distance from the measuring point at a center of the bottom portion is denoted by "r", a radius ratio (r/R) is >0.7, and
   wherein, when a radial direction of a test piece of the bottom portion cut out from the measuring point is denoted by "x" and a circumferential direction thereof by "y", then half-values are widths at a half peak of a Miller index at a diffraction angle 2θ=14.5° that represents diffraction by a crystal surface (110) in a peak intensity profile in a radial direction (x-direction) of a Debye's ring obtained by measuring diffraction intensities by causing X-rays to be incident on an x-y plane of the test piece at right angles thereto.

3. The container of claim 1, wherein all of the body portion and the bottom portion comprise a multi-layer structure.

4. The container of claim 2, wherein all of the body portion and the bottom portion comprise a multi-layer structure.

5. The container of claim 3, wherein the multi-layer structure comprises at least inner and outer layers of a polypropylene and an intermediate layer of another thermoplastic resin, the inner and outer layers completely covering the intermediate layer so that the intermediate layer is not exposed to a surface of the container.

6. The container of claim 4, wherein the multi-layer structure comprises at least inner and outer layers of a polypropylene and an intermediate layer of another thermoplastic resin, the inner and outer layers completely covering the intermediate layer so that the intermediate layer is not exposed to a surface of the container.

7. The container of claim 1, wherein the body portion comprises an inner layer, an intermediate layer and an outer layer, and has a ratio of thickness range of inner surface side:outer surface side equal to between 3:7 and 6:4, with the inner side being a thickness from an inner surface to a center of a thickness of the intermediate layer and with the outer side being a thickness from an outer surface to the center of thickness of the intermediate layer.

8. The container of claim 2, wherein the body portion comprises an inner layer, an intermediate layer and an outer layer, and has a ratio of thickness range of inner surface side:outer surface side equal to between 3:7 and 6:4, with the inner side being a thickness from an inner surface to a center of a thickness of the intermediate layer and with the outer side being a thickness from an outer surface to the center of thickness of the intermediate layer.

9. The container of claim 1, wherein the body portion comprises a stacking step formed in one of:
   an inner surface of the body portion; and
   an outer surface of the body portion.

10. The container of claim 2, wherein the body portion comprises a stacking step forming in one of:
    an inner surface of the body portion; and
    an outer surface of the body portion.

11. The container of claim 1, wherein a thickness of the body portion is not more than 2.0 mm.

12. The container of claim 2, wherein a thickness of the body portion is not more than 2.0 mm.

* * * * *